(12) United States Patent
Jacquet (10) Patent No.: US 11,087,302 B2
(45) Date of Patent: Aug. 10, 2021

(54) INSTALLATION AND METHOD FOR MANAGING PRODUCT DATA

(71) Applicant: JES Labs, Saint Herblain (FR)

(72) Inventor: Eric Jacquet, Nantes (FR)

(73) Assignee: JES LABS, Saint Herblain (FR)

( * ) Notice: Subject to any disclaimer, the term of this patent is extended or adjusted under 35 U.S.C. 154(b) by 0 days.

(21) Appl. No.: 16/633,413

(22) PCT Filed: Jul. 26, 2018

(86) PCT No.: PCT/FR2018/051916
§ 371 (c)(1),
(2) Date: Jan. 23, 2020

(87) PCT Pub. No.: WO2019/020947
PCT Pub. Date: Jan. 31, 2019

(65) Prior Publication Data
US 2020/0372487 A1     Nov. 26, 2020

(30) Foreign Application Priority Data

Jul. 26, 2017  (FR) ...................................... 1757109
Oct. 9, 2017  (WO) ................. PCT/FR2017/052752

(51) Int. Cl.
*G06Q 20/20*     (2012.01)
*G06Q 20/22*     (2012.01)

(52) U.S. Cl.
CPC ......... *G06Q 20/208* (2013.01); *G06Q 20/206* (2013.01); *G06Q 20/227* (2013.01)

(58) Field of Classification Search
CPC .. G06Q 20/208; G06Q 20/206; G06Q 20/227; G06Q 20/202; G06Q 50/12; G07G 1/0036
See application file for complete search history.

(56) References Cited

U.S. PATENT DOCUMENTS 5,013,896 A    5/1991  Ono
5,426,282 A    6/1995  Humble
(Continued)

FOREIGN PATENT DOCUMENTS

EP    2570967    3/2012
EP    3038015    6/2016
(Continued)

OTHER PUBLICATIONS

K. N. Do, J. Ohya, D. Pishva and G. G. D. Nishantha, "Feasibility of using machine vision based cash register system in a university cafeteria," 2010 3rd International Congress on Image and Signal Processing, 2010, pp. 2554-2558, doi: 10.1109/CISP.2010.5648169. (Year: 2010).*

(Continued)

*Primary Examiner* — Ashford S Hayles
(74) *Attorney, Agent, or Firm* — Ipsilon USA, LLP (57) ABSTRACT

The invention relates to an installation comprising an acquisition post (1) making it possible, for several successive users, to acquire data relating to a product or set of products and to generate corresponding pre-orders. The installation also comprises a processing post (2) which comprises a screen (20) and a pre-orders processing interface. The interface comprises elements for selecting reference products. When the operator selects a reference product, a datum of the reference product is added into an order associated with the pre-order currently undergoing processing. The invention also relates to a corresponding method.

17 Claims, 5 Drawing Sheets

(56) References Cited

U.S. PATENT DOCUMENTS

| | | | |
|---|---|---|---|
| 5,497,314 A | 3/1996 | Novak | |
| 5,992,570 A | 11/1999 | Walter | |
| 6,769,610 B2 | 8/2004 | Habara | |
| 7,076,441 B2 | 11/2006 | Hind | |
| 7,143,938 B2 | 12/2006 | Hammerle | |
| 8,106,775 B2 | 1/2012 | Ohkawa et al. | |
| 8,972,048 B2* | 3/2015 | Canora | G07F 9/026 |
| | | | 700/237 |
| 9,082,114 B2 | 7/2015 | Colley | |
| 9,741,241 B2 | 8/2017 | Mizui | |
| 10,679,200 B1* | 6/2020 | Wolter | G07F 9/026 |
| 10,679,469 B2* | 6/2020 | Salmen | G07G 1/0009 |
| 10,970,701 B2* | 4/2021 | Jacquet | G07G 1/0063 |
| 2005/0205677 A1 | 9/2005 | Patel et al. | |
| 2006/0231616 A1* | 10/2006 | Gibault | G06Q 30/06 |
| | | | 235/383 |
| 2007/0073586 A1* | 3/2007 | Dev | G06Q 30/0601 |
| | | | 705/14.25 |
| 2010/0076855 A1 | 3/2010 | Kamin et al. | |
| 2012/0047038 A1 | 2/2012 | Sano et al. | |
| 2012/0047040 A1* | 2/2012 | Ueda | G06Q 20/208 |
| | | | 705/23 |
| 2012/0327202 A1 | 12/2012 | Nagamachi | |
| 2013/0057670 A1 | 3/2013 | Fukuda | |
| 2014/0172610 A1 | 6/2014 | Carpenter | |
| 2015/0016672 A1* | 1/2015 | Tsunoda | H04N 5/23293 |
| | | | 382/103 |
| 2015/0039458 A1 | 2/2015 | Reid | |
| 2015/0194025 A1 | 7/2015 | Tsunoda | |
| 2016/0292662 A1* | 10/2016 | Kobayashi | G03B 17/53 |
| 2016/0300213 A1 | 10/2016 | Tabata | |
| 2017/0316271 A1 | 11/2017 | Saitou | |
| 2017/0358020 A1* | 12/2017 | Bender | G06Q 30/0621 |
| 2018/0232796 A1 | 8/2018 | Glaser | |
| 2018/0240180 A1 | 8/2018 | Glazer | |
| 2019/0114488 A1 | 4/2019 | Glazer | |
| 2019/0142196 A1* | 5/2019 | Barnum | A47G 19/06 |
| | | | 206/459.5 |
| 2019/0304238 A1* | 10/2019 | Ambauen | G01G 19/40 |
| 2019/0333039 A1 | 10/2019 | Glaser | |
| 2020/0134590 A1 | 4/2020 | Glaser | |
| 2020/0184445 A1 | 6/2020 | Biggs | |

FOREIGN PATENT DOCUMENTS

| | | | | |
|---|---|---|---|---|
| EP | 3070694 A1 | * | 9/2016 | G06Q 50/12 |
| ES | 2684532 B1 | * | 7/2019 | |
| JP | H07234896 | | 9/1995 | |
| JP | 2013186875 A | * | 9/2013 | |
| WO | 2013/039393 | | 3/2013 | |

OTHER PUBLICATIONS

W. Phetphoung, N. Kittimeteeworakul and R. Waranusast, "Automatic sushi classification from images using color histograms and shape properties," 2014 Third ICT International Student Project Conference (ICT-ISPC), 2014, pp. 83-86, doi: 10.1109/ICT-ISPC. 2014.6923223. (Year: 2014).*

G. Ciocca, P. Napoletano and R. Schettini, "Food Recognition: A New Dataset, Experiments, and Results," in IEEE Journal of Biomedical and Health Informatics, vol. 21, No. 3, pp. 588-598, May 2017, doi: 10.1109/JBHI.2016.2636441. (Year: 2017).*

International Search Report dated Oct. 1, 2018.

International Search Report dated Jan. 19, 2018.

References cited in the U.S. Office Action U.S. Appl. No. 16/342,115 dated Oct. 1, 2020.

* cited by examiner

INSTALLATION AND METHOD FOR MANAGING PRODUCT DATA

RELATED APPLICATION

This application is a National Phase of PCT/FR2018/051916 filed on Jul. 26, 2018, which in turn claims priority to French Patent Application No. 17 57109 filed no Jul. 26, 2017, the entirety of which are incorporated by reference.

FIELD OF THE INVENTION

The present invention relates generally to the acquisition of data relating to products and the processing of these data.

The present invention is advantageously applicable in the field of collective catering, but obviously the present invention can also be applied to other fields.

PRIOR ART

In the field of collective catering, the users usually take a meal tray, on which they deposit various products to be consumed, then they go to the checkout.

When the user has arrived at the checkout, the checkout operator identifies and records, on a computer system, the products corresponding to the content of the tray. The recorded products correspond to a sum that the user must pay.

Generally, the user presents a badge associated with an account which is debited by the amount of the sum to be paid. It is found that, as a high average, the number of tray passes per minute per checkout operator is low, of the order of six.

It will be understood that it is desirable to be able to reduce the waiting time of the users in such dining halls.

Systems are known from the state of the art and in particular from the documents EP3038015, U.S. Pat. No. 5,497,314 and WO2013039393 that make it possible to automatically identify products, then to pay, cash or using a payment card, a sum corresponding to these products.

From the document EP2570967A1 in particular, an installation is known that comprises an acquisition station and a pre-exit validation station. The products chosen by the user are positioned in an acquisition station which takes an image of the products with their bar code. A processor is used to read the data of each bar code. It will be noted that this solution is complex and costly since it entails applying a bar code to each product and according to an orientation suited to image-taking.

The risk of reading error resulting notably from degradation of the bar code is not negligible.

Such an installation requires not only that each product be provided with a specific identification element, such as a bar code, but, in addition, that the user, after having presented his or her products at the acquisition station, move with said products to the validation station to make the payment for said products.

The aim of the present invention is to propose an installation and a method that make it possible to overcome all or part of the problems explained above.

SUMMARY OF THE INVENTION

To this end, the subject of the invention is an installation comprising:

an acquisition station making it possible, for several successive users, to acquire data relating to a product or a set of products, such as the content of a meal tray, of each user, said acquisition station comprising:
a laying surface allowing the user to lay down said product or set of products;
an image acquisition device oriented toward the laying surface;
an identification device making it possible to identify the user;
a control device configured to perform the following operations for each user:
acquiring an identifier of the user;
acquiring an image of said product or set of products with the image acquisition device, before or after the step of acquisition of the identifier of the user;
a memory in which is stored, for each user, a set of data, called preorder, said preorder comprising a datum corresponding to the identifier of the user and a datum corresponding to the acquired image;
a memory in which are stored sets of data, called orders, each order comprising at least a part of the data of a preorder;
a processing station comprising a display screen, a human-machine interface and a processing unit configured to display, on the screen, a preorder processing interface which comprises:
a navigation zone making it possible to select a preorder;
an image display zone making it possible to display the image of the preorder;
an identifier display zone for displaying an identification datum of the user with which the preorder is associated;
selection elements each associated with a reference product,
a display zone, called order zone; said processing unit of the processing station being also configured to, when one of said selection elements is invoked by the operator, display a datum of the corresponding reference product in said order zone, and add, into an order associated with the preorder, the datum of said reference product.

Such an installation allows for an asynchronous processing of the product data which have been acquired with the acquisition station and stored in preorders, and thus benefit from a fluidity of passage of the users at the acquisition station.

In particular, the installation makes it possible, by virtue of the processing station, to input, in an order, product data from data of a preorder acquired previously using the acquisition station.

After the generation and the storage of a preorder in the preorder memory using the acquisition station, the processing station can act on a corresponding order formed from the preorder, independently of the operation of the acquisition station which can be used by a subsequent user to generate a subsequent preorder. Such an installation thus makes it possible to benefit from a continuity of service, by avoiding in particular requiring the user to go to the processing station to finalize his or her purchase, except in particular cases.

The acquisition station can rapidly generate preorders, while an operator can, from the processing station, process the preorder data at his or her own pace to form corresponding orders by adding reference product data into said orders using corresponding selection elements of the preorder processing interface.

The or each image displayed in the corresponding display zone of the processing interface allows the operator to determine the reference product which corresponds to a product present in the image. The operator can then actuate the corresponding selection element, in order to add, to an order generated from the preorder, data on the corresponding reference product and display these reference product data in the order zone of the processing interface. The actuation of the selection element can be done for example by clicking on said selection element using a mouse or by pressing on a corresponding zone of the screen when the latter has a touch interface.

Thus, in the case of an application to catering in which the acquisition station is used between the product dispensing zone and the eating zone, the function of asynchronous processing, by the processing station, of the data linked to the products which have been acquired by the acquisition station, makes it possible to optimize the fluidity of the passage of the users from the product dispensing zone to the eating zone.

Such an installation design offers a function of separation inasmuch as it is possible to suspend the processing of the preorders by the processing station, while the acquisition station can continue to generate preorders which are recorded in a computer memory that is accessible to the processing station.

The fact of being able to add data into an order, which comprises at least a part of the preorder data, makes it possible to progressively construct the order, without having to be concerned with the operation of the acquisition station.

In particular, the asynchronous processing, by the processing station, of the data acquired by the acquisition station, makes it possible to limit the time of passage, at the acquisition station, of the user associated with the tray and achieve thus a number of tray passages per minute per acquisition station of the order of twelve, bearing in mind that it is possible to associate several acquisition stations to further increase the number of tray passages per minute.

Such a decoupling of the acquisition of the data relating to the products brought by the users to the acquisition station, and the processing thereof by an operator at the processing station, also makes it possible to benefit from a visual a posteriori check by virtue of the remote displaying at the processing station of the images acquired by the acquisition station.

The storage of the data of an order in a memory makes it possible to construct the order in that memory, from preorder data from the acquisition station and additional data generated and added using the processing station.

Such an installation configuration makes it possible to simply, rapidly and reliably construct the data of an order.

The operations performed on the basis of the preorder data comprise operations of addition of data relating to the products identified from images of the preorder to introduce value data into the order, such as the price of the products to be paid for, useful to the payment process.

The images displayed in the display zone of the interface of the processing station allow the operator to determine the reference product which corresponds to a product present in a displayed image. The operator can then actuate the corresponding selection element, in order to add to an order, generated from the preorder, data on the corresponding reference product and display these data of the reference product in the order zone of the processing interface.

The added data are thus associated with the corresponding images of the preorder and are used to define a value corresponding to the price to be paid. These features of addition of data which are linked to the images allow the transaction to be completed, since the acquisition station does not supply data corresponding to price values associated with the products whose images are acquired.

Contrary to the solution of the document EP2570697A1, the solution according to the invention makes it possible to avoid having to provide the products with bar codes, which would be complex, costly and a source of error.

On the contrary, the solution according to the invention makes it possible to dispense with such bar codes using the preorder memory and by proposing, at the processing station, an interface which makes it possible to load the images from the preorder data and to construct a set of order data comprising at least a part of the preorder data and of the supplementary data, added using the interface of the processing station, which are useful to the transaction. In particular, the selection elements make it possible to add, into the order data associated with the preorder data, the data on the reference products which correspond to those present on the images loaded into the interface.

The acquisition station can thus rapidly generate preorders, while an operator can, from the processing station, process the preorder data at his or her own pace to form corresponding orders by adding reference product data into said orders using the corresponding selection elements of the preorder processing interface.

The fact of being able to add data into an order, which comprises at least a part of the preorder data, using the processing station, makes it possible to progressively construct the order, without being subject to a risk of bar code reading error as in the document EP2570967A1.

According to an advantageous feature of the invention, the installation comprises a database of user accounts in which are recorded user account data, each user account comprising:

an identifier of a user;
a balance value, credit or debit;
and the control device is configured to determine whether the identifier of the user that has been acquired corresponds to the identifier of the user of a recorded user account.

The operation of the acquisition station or the authorization to leave the installation can be conditioned on the fact that the identifier of the user that has been acquired does indeed correspond to a recorded user account, and possibly to other characteristics of said user account, for example relating to the balance. Otherwise, provision can be made for the user to be prompted, for example by a message displayed on a screen, to go to another installation or to go to a processing station of the installation.

According to an advantageous feature of the invention, each user account comprises right-of-use information to indicate whether the user associated with the user account is or is not authorized to use said acquisition station or the installation, and the control device is configured to, after having determined whether the user account corresponds to the identifier of the user that has been acquired, authorize or not authorize the use of the acquisition station or of the installation as a function of the right-of-use information associated with said user account.

According to a particular aspect, an order comprises the identifier of the corresponding user and a value corresponding to the sale price of said product or set of products.

According to an advantageous feature of the invention, the installation comprises a memory in which are stored sets of data called tickets, each ticket comprising at least a part of the data of an order and/or a part of the data of the associated preorder, and at least a part of the data of a ticket associated with a user is accessible from a terminal.

According to an advantageous feature of the invention, the acquisition station is configured to function independently of the processing station.

According to an advantageous feature of the invention, the processing station is configured to make it possible to process preorders that have been generated, independently of whether the acquisition station is continuing to operate or has stopped.

According to an advantageous feature of the invention, said processing station is configured to make it possible to switch between the preorder processing interface and another interface, called direct input interface, in which no image of product(s) acquired by the acquisition station is displayed, said processing unit being configured to, upon a use of the direct input interface, generate a set of data, called direct order, which includes at least one datum of a reference product corresponding to a selection element invoked by the operator.

According to an advantageous feature of the invention, the processing unit is configured to, when the identifier of a user is input or detected, and a preorder is associated with said identifier, automatically select said preorder by displaying the corresponding identification and image data in the preorder processing interface.

According to an advantageous feature of the invention, said processing station is configured to allow the operator to act on the image, for example by zooming or by navigating in the image.

According to an advantageous feature of the invention, each preorder comprises preorder status information indicating whether the preorder is:
  to be processed; or
  currently being processed, or
  processed;
and the processing station is configured to filter the preorders to be displayed in the processing interface as a function of their status.

According to an advantageous feature of the invention, each reference product comprises a product naming datum, a price datum and a quantity datum, said processing unit of the processing station is configured to add these product naming, price and quantity data into the order when said reference product is selected in the preorder processing interface.

According to an advantageous feature of the invention, said preorder also comprising, for each image, a position datum relating to the product or to the set of products relative to said image,
said processing station is configured to display, in the image zone of the processing interface, an enlarged view of said image as a function of said position datum.

According to an advantageous feature of the invention, the acquisition station comprising a display screen and the image acquisition device comprising a camera, the control unit is configured to:
  trigger the display on the screen of the image filmed by the camera when the introduction of the product or of the set of products at the laying surface is detected;
  trigger the stopping of the display of the filmed image when the product or the set of products is removed from the laying surface.

According to an advantageous feature of the invention, the processing station is configured to make it possible to modify the orders corresponding to the preorders that have been processed.

According to an advantageous feature of the invention, the installation comprises several processing stations and/or several acquisition stations.

The invention relates also to a product data management method, implemented using an installation as described above,
characterized in that the method comprises the generation of preorders using the acquisition station,
and in that the method comprises, using the processing station, the following steps:
  displaying an image of a preorder in the image display zone of the processing interface;
  using the selection elements of the processing interface of the processing station, adding, into an order associated with the preorder, data of a reference product corresponding to a product present in the displayed image.

According to an advantageous feature of the invention, the steps performed using the processing station are performed asynchronously with respect to those or that performed with the acquisition station.

According to an advantageous feature of the invention, the control device is also configured to, after the identifier has been associated with the acquired images, command an exit authorization or indication device to permit or indicate to the user to take back his or her product or products.

According to an advantageous feature of the invention, the acquisition station comprises a lighting system making it possible to illuminate the laying surface.

According to an advantageous feature of the invention, the acquisition station comprises a bottom face which extends substantially orthogonally to the tray laying surface. The bottom face is configured so as to offer a better diffusion of the light from the lighting system, by comparison with the laying surface.

In particular, the diffusion of the light by the bottom face makes it possible to enhance the uniformity of the distribution of the lighting on said at least product by limiting the size of the dark zones and by limiting the presence of light reflections.

The laying surface is chosen so as to diffuse the light received as little as possible to limit the return of the light, from the lighting system, to the image acquisition devices opposite which said laying surface is situated and ensure a sufficient contrast with said products to be identified.

According to an advantageous feature of the invention, the acquisition station comprises a bottom face which extends substantially orthogonally to the laying surface, the image acquisition device comprises a first image acquisition unit whose optical axis is oriented vertically, and two other image acquisition units disposed on either side of a plane passing through the optical axis of the first image acquisition unit and at right angles to the bottom face of the acquisition station.

Such an arrangement of the image acquisition units, which comprise cameras for example, makes it possible to obtain images from different angles to reliably identify the product or products present. In particular, such an arrangement makes it possible to effectively identify, with at least one of the image acquisition units, a product which would be concealed by another product in the field of another image acquisition device.

The second and the third image acquisition units are preferably oriented in such a way that their optical axes form an angle lying between 40° and 50°, preferably 45°, with the vertical.

According to an advantageous feature of the invention, the image acquisition device comprises one or more CCD sensors, the control device is configured to detect the ambient brightness, and set the sensitivity of the CCD sensor or sensors as a function of the measured ambient brightness.

According to an advantageous feature of the invention, the image acquisition device making it possible to supply a video stream, the control device is configured to:
- detect the introduction of said product or set of products on the laying surface;
- display on the screen, the video of the product or of the set of products present on the laying surface, as well as information defined as a function of the position of the product or of the set of products relative to the laying surface to indicate whether the product or the set of products is correctly positioned.

According to an advantageous feature of the invention, to perform the image acquisition step, the control device is configured to extract an image from said acquired video stream.

According to an advantageous feature of the invention, the control device is configured to, from the images of the video stream and as a function of at least one predefined rule, determine whether the product or the set of products is or is not correctly positioned relative to the laying surface.

According to an advantageous feature of the invention, the control device is configured to authorize or not authorize the acquisition of the user identifier using the identification device, as a function of the state of positioning of said product or set of products relative to the laying surface.

According to an advantageous feature of the invention, the control device is configured to trigger the acquisition of the images of said product or set of products as a function of characteristics of the acquired user identifier.

According to a particular aspect, the bottom face is less absorbent to natural light than the laying surface. Preferentially, the lighting system emits a light of daylight type, for example of color temperature of the order of 6400° K. The light emitted by the lighting system is therefore absorbed less by the bottom face than by the laying surface. The bottom face is matt for a good diffusion of light and thus a uniformity of lighting. Advantageously, the laying surface is matt to avoid the appearance of flashes.

According to an advantageous feature of the invention, the lighting system comprises lighting devices and a light diffusion device, such as a translucent plate, for example made of plexiglass.

The diffusion of the light by the diffusion device makes it possible to obtain a uniform distribution of the light and to limit the presence of dark and/or of bright reflection which could appear on the images and hamper the use thereof.

According to an advantageous feature of the invention, the light diffusion device has a face, oriented toward the laying surface, which is curved.

The curvature of the face of the diffusion device which is oriented toward the laying surface favors the correct distribution of the light flux on the or the set of products to be identified.

According to an advantageous feature of the invention, the laying surface is formed by a single piece and has, on the side of the bottom face, a raised edge limiting the risk of infiltration into the acquisition station.

According to an advantageous feature of the invention, the acquisition station comprises a chamber in which the lighting system is housed, said chamber extends above and away from the laying surface, said chamber having a front part of greater width than that of the laying surface.

According to an advantageous feature of the invention, said acquisition station comprises a system for communication with the user, preferably interactive, comprising a display device making it possible in particular to display an image of said at least one product.

The installation thus makes it possible to be able to reduce the time of passage of the users while benefiting from images of the products which can reliably be able to correctly identify or assist in identifying these products.

In the case of collective catering where said product or set of products corresponds to the content of a tray, the installation makes it possible to speed up and smooth the flow of the passage at the checkout formed by the installation.

According to a particular embodiment, the installation is without any means for automatically recognizing characteristics, such as a code relating to a price, of the product or products whose image or images are acquired at the acquisition station. The information linked to the or each product is supplied by the processing station using the selection elements of the corresponding interface intended to be invoked by an operator asynchronously with respect to the generation of the preorders.

BRIEF DESCRIPTION OF THE DRAWINGS

Other features and advantages of the invention will emerge further from the following description, which is purely illustrative and nonlimiting and should be read in light of the attached drawings, in which.

DETAILED DESCRIPTION

The concept of the invention is described more fully hereinbelow with reference to the attached drawings, in which embodiments of the concept of the invention are shown. In the drawings, the size and the relative sizes of the elements may be exaggerated for the purposes of clarity. Similar numbers refer to similar elements in all the drawings. However, this concept of the invention can be implemented in numerous different forms and should not be interpreted as being limited to the embodiments explained here. Instead of that, these embodiments are proposed in such a way that this description is comprehensive, and communicate the scope of the concept of the invention to the person skilled in the art. The scope of the invention is consequently defined by the attached claims.

A reference throughout the description to "an embodiment" means that a functionality, a structure, or a particular feature described in relation to an embodiment is included in at least one embodiment of the present invention. Thus, the appearance of the expression "in one embodiment" at various points throughout the specification does not necessarily refer to the same embodiment. Furthermore, the functionalities, the structures, or the particular features can be combined in any appropriate manner in one or more embodiments.

Figure 1:
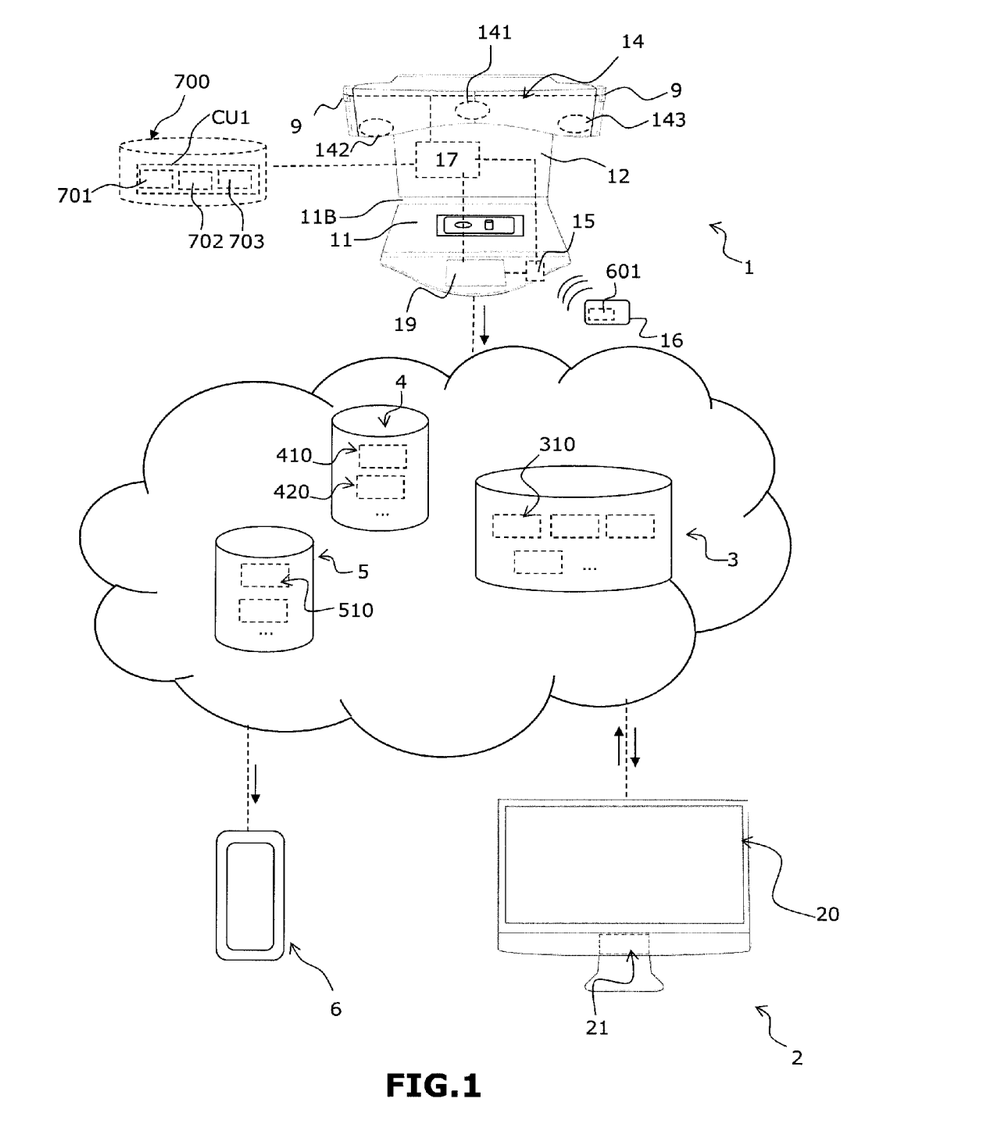
FIG. 1 is a schematic view of an installation according to an embodiment of the invention.

FIG. 1 schematically illustrates an installation according to an embodiment of the invention. The installation comprises an acquisition station 1. An example of acquisition station 1 is described in the international application published under the number WO2018073510 (A1), the content of which is fully incorporated for reference in the present application.

According to a particular embodiment, the installation comprises several acquisition stations which can operate in parallel with one another. Thus, the description hereinbelow is given for one acquisition station 1 but applies obviously to an installation configuration in which there are several acquisition stations.

The acquisition station 1 allows several successive users to acquire information relating to a product or set of products of each user. Product is understood to mean a concrete object, of edible or inedible type, that the user can manipulate.

According to one embodiment and as in the example illustrated in the figures, the product or set of products comprises the content of a meal tray. The product or set of products can be considered as being the content of the tray and the tray itself, because the image of the tray is intended to be acquired at the same time as its content, even if the aim is to allow the operator of the processing station 2 (presented hereinbelow) to input data corresponding to the content of the tray. For all that and according to a particular aspect, the tray and in particular its positioning relative to the acquisition station 1 can be used to control the operation of the acquisition station 1.

Likewise, as detailed hereinbelow, the tray, in particular its outline, can serve as a reference frame upon the display of an image in the processing interface 200 (presented hereinbelow) of the processing station 2. Obviously, the rest of the description is also applicable to the case where the product or set of products is a product or set of products other than the content of a meal tray.

The acquisition station 1 comprises a laying surface 11 allowing the user to lay down his or her meal tray. The acquisition station can comprise registration means, for example visual and/or physical for positioning the tray. As explained hereinbelow, it is also possible to provide for a display screen to display the image of the tray and indicate the positioning of the tray to be achieved by the user, for example by displaying an outline within which the image of the tray should be situated.

Figure 9:
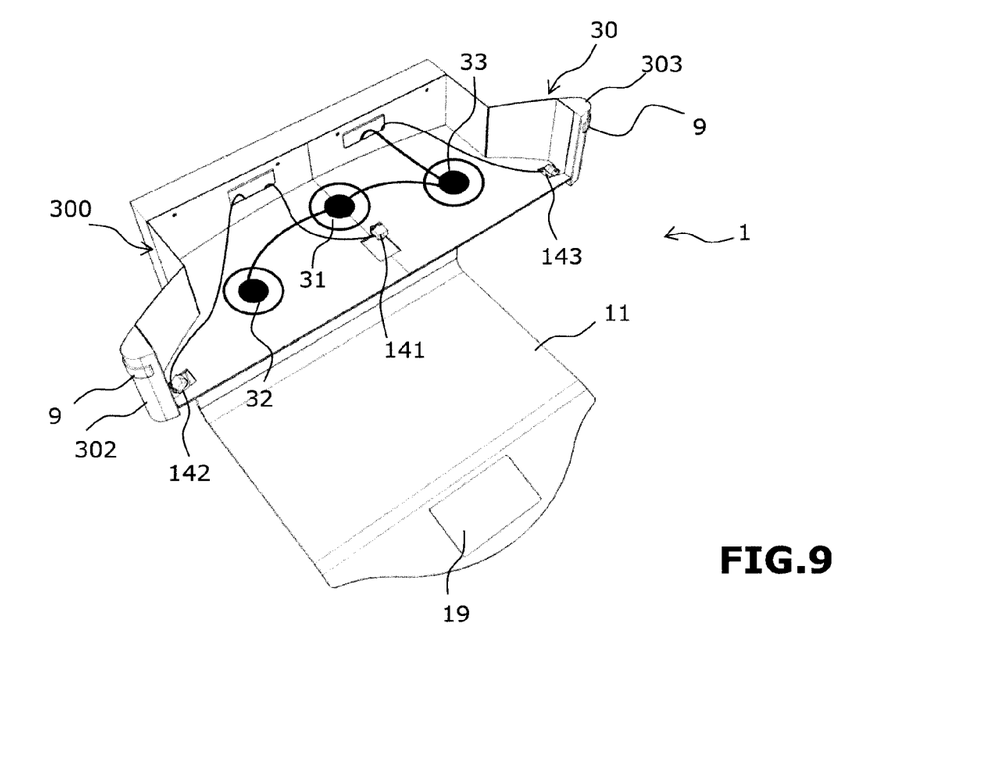
FIG. 9 is a perspective view of the acquisition station of an installation according to an embodiment of the invention, a part of the cladding of the acquisition station being removed to show the lighting system and the image acquisition device.

According to one embodiment, the station comprises a lighting system 30, making it possible to illuminate the tray laying surface. As illustrated in FIG. 9, the lighting system 30 is disposed above the tray laying surface 11.

An image acquisition device 14 is oriented toward the laying surface 11. In the example illustrated in the figures, the image acquisition device 14 comprises several image acquisition units 141, 142, 143 configured to take an image of a tray and of its content on each passage of a user.

In particular the use of several image acquisition units makes it possible to benefit from images of the or of the set of products from different angles and thus reliably identify said product or set of products. Thus, according to one embodiment, the image acquisition units 141, 142, 143 are oriented toward the tray laying surface 11 according to different optical directions in order to be able to acquire images of the tray from different angles.

According to a particular aspect, each image acquisition unit is a CCD camera. Thus, hereinafter in the description, each image acquisition unit is a camera, but the description applies also to other types of image acquisition unit, and in particular to cameras other than CCD cameras.

As a variant, the acquisition device can comprise another number of units, for example a single image acquisition unit. Preferentially, the or each image acquisition unit is a camera which makes it possible to film and/or photograph the zone corresponding to the laying surface 11 and to acquire, for each user, an image of the tray and of its content.

The acquisition station 1 comprises a bottom face 12 which extends substantially orthogonally to the tray laying surface 11. The bottom face 12 is chosen so as to exhibit a better diffusion of the light from the lighting system compared to the laying surface 11. Preferentially, the bottom face 12 is matt, for example matt white. According to one embodiment, the laying surface 11 is darker than the bottom face 12. According to a preferred embodiment, the laying surface 11 is of gray color to make it possible to reliably distinguish the laying surface from the content of the tray and from the tray itself.

The lighting system 30 comprises lighting devices 31, 32, 33 and a light diffusion device 34, such as a translucent plate, for example made of plexiglass. Advantageously, the lighting devices are arranged in a triangle or a circular arc.

According to one embodiment, the light diffusion device 34 has a face, oriented toward the tray laying surface 11, which is curved.

Advantageously, the tray laying surface 11 is formed in a single piece and has, on the side of the bottom face 12, a raised edge 11B limiting the risk of infiltration into the station. The side of the bottom face 12 is the side of the base which is opposite the zone where the holder of the tray is situated when standing facing the acquisition station.

Figure 10:
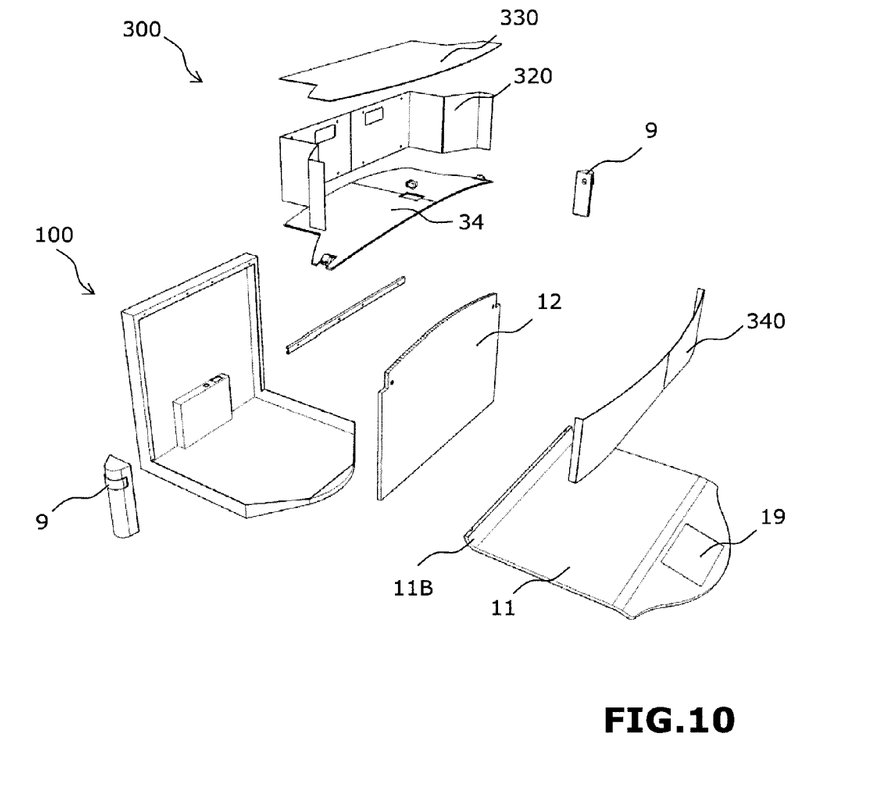
FIG. 10 is an exploded view of the acquisition station of an installation according to an embodiment of the invention, the lighting system not being represented.

As illustrated in FIGS. 9 and 10, the acquisition station 1 comprises a chamber 300 in which are housed the lighting devices 31, 32, 33 and the image acquisition units 141, 142, 143.

Said chamber 300 extends above and away from the tray laying surface 11. The chamber 300 and the laying surface define between them a space for insertion of the tray, open laterally and at the front, by contrast with the bottom face.

Said chamber 300 has a front part of greater width than that of the laying surface. The width of said chamber 300 corresponds to a dimension taken in a direction parallel to the axis which links the open lateral faces of the station by contrast to the height and to the depth of said station.

To this end, the front part of the chamber 300 comprises a top wall 330 and peripheral walls 320, 340, with, in particular, lateral parts, called ears 302, 303, that make it possible to maximize the different shooting angles and the lighting surface while minimizing the volume necessary to the integration and the visual impact. The diffusion face 34 forms the bottom face of said chamber 300.

As illustrated in FIG. 10, the acquisition station 1 comprises a frame 100. The frame 100 is in the form of a bracket and preferably made of a single piece to ensure the rigidity of all the elements and allow any type of implementation: placed on or incorporated in a piece of furniture, placed on a stand or post, or fixed to the wall.

A space is delimited between the frame 100 and the bottom face 12 and/or laying surface to allow the integration of all of the technical elements within the structures to avoid having cables or connection elements visible and potential causes of safety and/or hygiene problems.

A secure terminal block (secured to limit accidental access to the connection element) makes it possible to connect the acquisition station to the external devices and to the network without opening the station while protecting the access against abusive handling.

Advantageously, the bottom face 12 and/or the laying surface 11 are removable from the frame 100. The fact that provision is made for the base and/or the bottom face to be at least partly dismantlable and therefore replaceable makes it possible to facilitate the cleaning of the station 1. The fact that the face 12 and/or laying surface 11 are at least partly dismantlable also makes it possible to easily access the active components of the station, which simplifies maintenance.

The acquisition station takes the form of a structure whose lateral faces and front face are open to be able to introduce and remove the tray in a fluid manner.

Said acquisition station 1 comprises a system for communication with the user, preferably interactive. The communication system comprises a display screen 19 and an interactive communication interface with the user. The interactive communication interface comprises, for example, a touch-sensitive layer of the screen, and/or a microphone and/or a loudspeaker. Advantageously, said display device is a touch screen, for example allowing the user to view the state of positioning of his or her tray with respect to a tray laying zone, and possibly validate and/or correct information in case of automatic recognition of the products present on the tray.

In the example illustrated in the figures, the bottom front part of the station which receives the display screen 19 has a plane adapted by its tilt and its incurved forms for good user accessibility. Such a design makes it possible to avoid reflections and renders the station accessible to handicapped persons.

Said station comprises a natural convection cooling system which is arranged for the cooling of at least a part of the control device. The natural convection cooling system makes it possible to avoid the addition of a fan in order to reduce energy consumption, noise and risks of failures. Advantageously, the cooling system is incorporated between the frame and the bottom face 12, and advantageously comprises an air access gate below and above.

The installation comprises a database 700 of user accounts which comprises predefined user account data. The database 700 of user accounts is local or remote with respect to the station 1. The database 700 takes the form of a memory which can be at least partly common with all or part of the other memories presented hereinbelow or physically distinct. In the example illustrated in FIG. 1, a single user account CU1 is schematically represented, but obviously several user accounts that are not represented are defined in the database 700.

According to a particular aspect, each user account CU1 comprises an identifier of a user 701 of the account and an account balance value 702, credit or debit. According to a preferred embodiment, each account is a private computerized banking account.

According to a particular aspect, each user account CU1 also comprises other information, such as right-of-use information 703. The right-of-use information 703 is for example information indicating whether the user is or is not authorized to use said acquisition station or the installation. It is in fact possible to provide for the user to be authorized to access a given station present in a dining hall, but not to another station which might be present in another dining hall.

The usage information can comprise one or more data allowing the control device (presented hereinbelow):
 to validate the general right of use of the station out of several stations, and/or
 to verify the status of the account: for example "valid", "closed",
 if appropriate, to check the status of the physical support of the user identifier (such as a badge): for example "lost", "active" or "inactive".

The control device commands the message display on the screen as a function of these data.

Advantageously, the user account comprises a datum corresponding to the authorized number of passages, that is to say the number of times that the identifier acquisition and image acquisition cycle can be performed before the account is debited. Thus, it is possible to provide for the control device to prevent the execution of a new cycle when the authorized number of passages is reached and as long as the account is not debited, and for the control device to command the display on the screen of a corresponding message.

Thus, when this number of passages is set at 1, the user can pass only a single tray at the station, which avoids having the user pass an indeterminate number of trays even though his or her account does not have sufficient funds. Indeed, since the account is debited in a manner that is out of sync with respect to the cycle of acquisition and association steps performed at the station, the recognition of a given authorized number of passages, combined with the recognition of a balance threshold value that makes it possible to use the acquisition station or the installation, makes it possible to reduce the cases of fraudulent use of the installation.

According to one embodiment, each user account also comprises information relating to the station or stations that the user can or cannot access. As an example, it is possible to provide for this information to be a station identifier that the user can access.

An identification device 15 makes it possible to identify the user. According to one embodiment, said identification device 15 comprises a badge reader that makes it possible to read an identifier 601 contained in a badge 16 of the user. As an example, the badge reader is a contactless reader. Obviously, the user identifier could be obtained other than by reading a badge.

As a variant, the identification device 15 can be a device configured to communicate with the telephone of the user to retrieve the user identifier or can be any other type of unit that makes it possible to collect an identifier, for example of electronic type, or biometric information.

A control device 17 is configured to acquire the identifier of the user, and acquire an image of said tray and of its content with each of the units 141, 142, 143 of the image acquisition device 14. Thus, in the example illustrated in the figures, the user can pass his or her badge 16 in front of the reader 15 which then reads the associated identifier, which makes it possible to trigger the taking of an image by each unit 141, 142, 143. Such an embodiment makes it possible to optimize the time of passage on the station and the ergonomy of the station. The number of actions to be performed by the user is reduced and the user benefits from the comfort associated with the fact of being identified after having put down his or her tray. Furthermore, the processing of the data is performed fluidly since it is uninterrupted.

The control device also communicates with the database 700 of user accounts from which it receives the user account data.

The control device can thus compare the identifier of the user acquired with the user account data to determine whether there is a recorded user account corresponding to said user identifier. In the affirmative, the control device can compare the identifier of the station that it has in memory with the station identifier associated with the user account to determine whether the user has the right to avail him or herself of this station.

The images of the set of products acquired by the cameras 141, 142, 143 are associated in a database 3, called preorder database, with the identifier of the user, after having checked that the user identifier 601 acquired does indeed correspond to the user identifier 701 of a user account predefined in the first database 700. Reference is made to the association of the images with the user identifier 701, but, obviously, reference could be made to the user identifier 601 which corresponds to the user identifier 701. The order in which the images and the identifier 601 are acquired can vary depending on the embodiments. Different embodiments are presented hereinbelow. The images and the identifier 701 thus form part of or constitute a set of data, also called preorder, which can be used to manage the purchase of said set of products. A preorder is thus stored in the database 3 each time a user passes at the station.

It is understood that the images and identifier can be stored by being copied directly into the database 3 or using a referral datum, for example an access link to an image stored somewhere other than the database memory. According to a particular aspect, the images can undergo processing operations between their acquisition and their storage in the database 3.

Thus, the second database 3 comprises sets of data which include, for each user identifier acquired to which a user identifier of a user account corresponds, the acquired images which are associated with said user identifier. It is thus possible to then retrieve the acquired images from the user identifier.

Advantageously, the control device compares the balance with the threshold value associated with the account and displays on the screen alert information when the balance is below said threshold value.

Provision can be made for the value of the balance to be displayed on the screen 19 after the identification device 15 has acquired the user identifier and the control device has determined the corresponding recorded user account.

According to one embodiment, once the identifier is acquired and the corresponding user account is identified, the screen 19 displays the balance before debit. The display of this balance information makes it possible to keep the gaze of the user on the screen to follow the indications displayed on the screen. As explained hereinabove, this information can for example be a prompt to take back his or her tray to go and eat (nominal case) or to go to another station (particular case).

According to a particular embodiment, it is also possible to provide for the step of acquisition of the identifier of the user to be performed after the image-taking. Preferentially, provision is made for the control device 17 to execute a step of determination of the position status, correct or incorrect, of the tray and/or of its content on the laying surface prior to the image acquisition step.

As explained in the international application published under the number WO2018073510 (A1), the control device comprises a processing and computation unit, such as a computer, a tablet, or a unit of another type comprising a processor or microprocessor. The control device can also comprise:

a block of internal peripheral devices for interfacing the peripheral devices of the station with the processing unit. Said peripheral devices can comprise, for example, the image acquisition devices, such as cameras, sensors, the lighting system, lamps, a printer, etc., a block of external peripheral devices for interfacing the station with a data communication network and external peripheral devices, such as an access gate, an electrical power supply.

The acquisition of the user identifier can be followed by steps of checks associated with this identifier, such as a step of checking for the existence of an associated recorded user account and possibly a step of checking the access authorization for the use of said acquisition station and/or the state of the balance of the account. The acquisition of images and/or the triggering of other steps can thus be conditioned on one or more of the checking steps associated with the identifier.

In particular, provision can be made for the acquisition of images to be conditioned on the fact that the user identifier does indeed correspond to an identifier of a known user account and possibly on the fact that information on authorization to use the acquisition station or the installation is associated with this user identifier. Provision can be made for the image to be acquired independently of the balance and for the balance then to be checked, to, in case of a balance shortfall, indicate to the user to top up his or her account or go and pay at a specific distinct station.

Computer data corresponding respectively to the identifier of the user (datum 316) and to the associated acquired images (data 311, 312, 313) are then stored in a computer system memory 3. The memory can be a local memory incorporated in the acquisition station or remote. The acquired identifier of the user is thus associated with the acquired images. As detailed hereinbelow, the association of the identifier of the user with these images makes it possible to efficiently and reliably manage the purchase of the product or products by the user and, if necessary, also control access to the station.

In particular, such an installation design allows the user to lay his or her tray at the acquisition station for the time it takes for the identifier acquisition, image acquisition and association operations to be performed, so that the user can then leave said acquisition station to go to eat, without the user having to go to a distinct second station, except in certain particular cases, for example when the user is not recognized. In this particular case, the user can be prompted, by corresponding indications displayed on the screen, to go to a specific processing station where there is an operator present.

According to a particular aspect, the installation issues an authorization to leave the station to go to eat (nominal case) or a prompt to go to another point, for example a specific processing station (particular case), which is embodied by a displayed message and/or by the emission of a visual and/or auditory signal, and/or by the emission of a command signal for a mechanical passage control system for example to unlock a barrier.

In the example illustrated in the figures, the identifier of the user and the associated acquired images form part of a set of data 310 hereinafter in the description designated by the term "preorder". The term preorder reflects the fact that, in the passage of the user at the acquisition station, images of the tray and of its content have been stored, but the products which form the content of the tray have not yet been identified and, in particular, the data specific to these products such as their name, their price and their quantity are not yet stored. As explained hereinbelow, provision is made for these product data to be added using the processing station 2 into a set of data called order.

Figure 2:
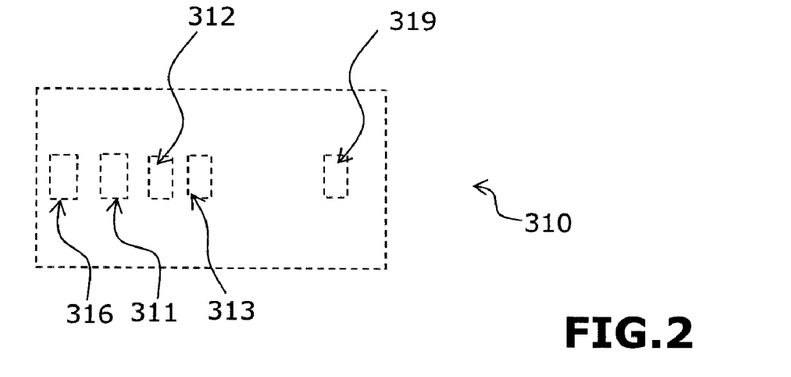
FIG. 2 is a schematic view of a set of data corresponding to a preorder according to an embodiment of the invention.

In FIG. 2, a preorder 310 has been schematically represented which comprises the image data 311, 312, 313 which can be the images acquired by the units 141, 142, 143. Provision can be made for the acquired images to be preprocessed or not before they are recorded to form the image data 311, 312, 313. Generally, an image which corresponds to a given shot of a product or of a set of products can undergo different processes at different steps in the operation of the installation, for example in terms of format and/or of quality, while being considered as being one and the same image in the interests of clarity. According to one embodiment, each preorder also comprises other data, such as, for example, the position of the tray in the image.

As illustrated in FIG. 1, the installation also comprises a processing station 2. According to a particular aspect, the processing station 2 is distinct and preferably remote from the acquisition station 1. According to one embodiment, the installation comprises several processing stations which can operate in parallel with one another. Thus, the description given hereinbelow for one processing station 2 applies, obviously, to an installation configuration in which there are several processing stations.

The processing station 2 comprises a display screen 20, a human-machine interface, such as a mouse or a touch-sensitive layer of the screen, a processing unit 21, such as a processor or microprocessor, and an electrical power supply. The processing station 2 is for example formed by a computer on which there is installed software making it possible to implement the functionalities detailed hereinbelow.

The processing unit 21 is configured to display on the screen 20 a preorder processing interface 200. The preorder processing interface 200 comprises a navigation zone 212 comprising navigation elements 212A that make it possible to select a preorder to be processed. The selection of a preorder of a user makes it possible to display information relating to said preorder. In particular, the processing interface 200 comprises an image display zone 212B corresponding to the image data 311, 312, 313 of the selected preorder.

The processing interface 200 of the processing station 2 allows the operator to act on the images, so as to manipulate the tray in a virtual manner, for example by zooming or navigating in the images.

Thus, the preorder processing interface makes it possible not only to navigate within the queue (or stack) of preorders generated using the acquisition station 1, but also to navigate in or manipulate an image associated with a preorder.

The preorder processing interface 200 also comprises a display zone for user identification information 211 corresponding to an identification datum of the user of the preorder. The user identification datum corresponds directly or indirectly to the acquired identifier. According to a particular aspect, the user identification information makes it possible to identify an account associated with the user, that is to say a corresponding user account.

The preorder processing interface 200 also comprises a display zone 213 for a plurality of selection elements which comprise, here, selection buttons 213A, 213B, 213C, 213D each associated with a reference product. Each reference product is a product likely to be present on the acquired images and whose data—such as title, price, and/or quantity data, are prerecorded in a memory of the installation, for example in an installation parameterization step.

Figure 5:
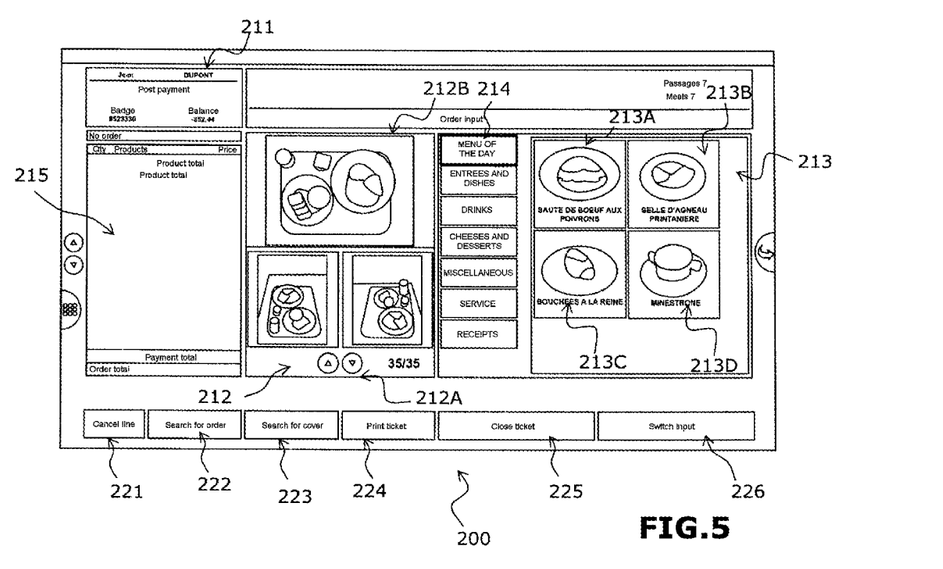
FIG. 5 is a schematic view of a preorder processing interface of a processing station according to an embodiment of the invention.

As illustrated in FIG. 5, a button or a set of buttons 213A, 213B, 213C, 213D of reference products can be accessible from another button 214, called category button, corresponding to a category within which said reference products are grouped. Thus, it is possible to provide for the buttons 213A, 213B, 213C, 213D to be displayed when the user has clicked on the "menu of the day" button 214 or else for them to be displayed by default. Likewise, the interface comprises other buttons for categories that can be selected by the user to make it possible to display reference product selection buttons associated with these categories.

The preorder processing interface 200 also comprises a display zone, called product order zone 215. The order zone 215 makes it possible, when the operator actuates a selection button associated with a reference product, to display information on the corresponding reference product in said order zone 215. Thus, when the operator clicks on the button 213A, the order zone 215 displays the name of the product, the price and the quantity.

Furthermore, when one of the selection buttons, for example the button 213A, is actuated by the operator, reference product data associated with that button, for example the name of the product, the price and the quantity, are added into the order 410. According to a particular aspect, provision can be made for the addition of reference product data into the order to require validation from the operator.

According to one embodiment, the processing interface also comprises at least one of the following buttons to meet preorder processing or direct input needs:
  a button 221 making it possible to cancel a line of the order zone 215 and delete the corresponding product data in the associated order;
  an order search button 222 to make it possible to recall to the interface the data of a pending order or of a closed order;
  a user search button 223 for associating a user with an order to be input using the direct input interface;
  a button 224 making it possible to print a ticket deriving from an order;
  a button 225 making it possible to close an order to generate a ticket;
  a button 226 making it possible to switch between the preorder processing interface and the direct interface as explained hereinbelow.

Figure 3:
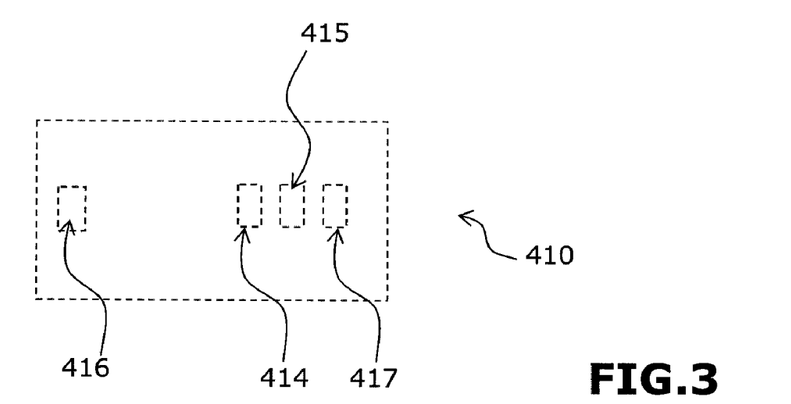
FIG. 3 is a schematic view of a set of data corresponding to an order according to an embodiment of the invention.

As illustrated in FIG. 3, the order 410 comprises a datum 416, corresponding to the identification datum 316 of the preorder 310, and data, here referenced 414, 415, 417, corresponding to the product data associated with the reference product selection button actuated by the user.

As explained above, for each processed preorder, there is a corresponding order which comprises data corresponding to at least a part of the data of said preorder and additional data resulting from the selection of one or more reference products. According to one embodiment, the order does not repeat some of the preorder data, such as the image data and the position datum of the tray relative to the image.

According to a particular aspect, each preorder 310 also comprises preorder status information 319 indicating whether the preorder is:
- to be processed;
- currently being processed (an order currently being constructed); or
- processed (that is to say when the corresponding order is closed and therefore the ticket has been generated).

According to one embodiment, the processing station 2 allows the operator to view the state of said preorder 310. When the installation comprises several processing stations, a preorder currently being processed by a processing station is not accessible to the other processing stations.

In the example illustrated in the figures, said orders are stored in a memory 4 of a computer system which is distinct from the memory 3. As a variant, said memories can be common. Furthermore, in the example schematically represented in FIG. 1, an order and the corresponding preorder are two distinct entities. As a variant, provision can be made for an order and the associated preorder to be one and the same entity, that is to say one and the same set of data, which is considered as an order when one of the data of said set has a given value and considered as a preorder when said datum has another value.

Each order can be used to generate a ticket. Each ticket corresponds to a set of data which comprises at least a part of the data of a preorder and/or at least a part of the data of the order associated with said preorder. Each ticket also comprises one or more other data. The tickets generated can be stored in a computer system memory 5.

The memory 5 can be common to or distinct from the memory 3 or 4. Likewise, the ticket can be a distinct entity from the order and/or from the preorder, or be one and the same entity, that is to say one and the same set of data which is then considered as a ticket, a preorder or an order as a function of the value taken by one of the data of said set.

Figure 4:
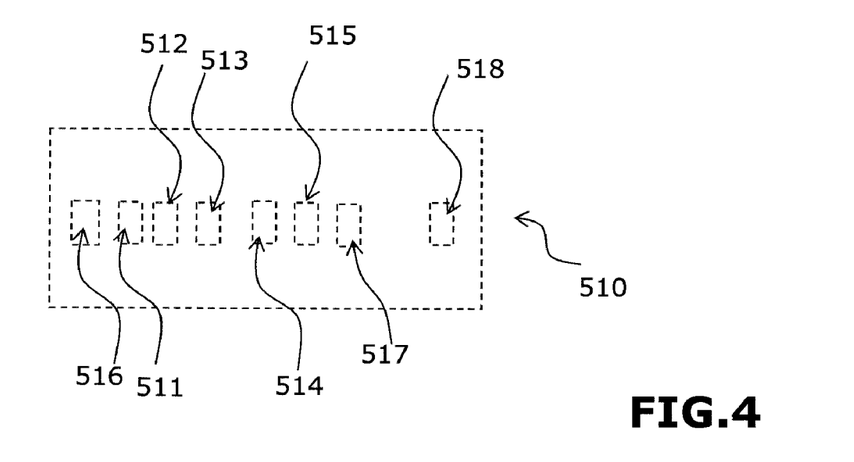
FIG. 4 is a schematic view of a set of data corresponding to a ticket according to an embodiment of the invention.

Thus, a ticket 510 can be generated from the order 410 and from the associated preorder 310. As illustrated in the embodiment of FIG. 4, the ticket 510 comprises:
- a user identification datum 516 which corresponds directly or indirectly to the identification datum 416 or 316,
- a main image datum 512, which is the top view of the tray, and secondary image data 511 and 513 corresponding to opposing side views of the tray and which correspond respectively to the data 312, 311 and 313 of the preorder;
- product data 514, 515, 517 corresponding to the product data 414, 415 and 417 of the order.

The ticket 510 also comprises a specific datum 518, that is to say one not present in the order or the preorder. According to a particular aspect, this specific datum is a payment method datum (for example bank card, cash, payment by account) and/or a tax datum, such as the identification number of the establishment of the operator of the installation and/or the version of the software which has made it possible to generate the ticket.

Figure 6:
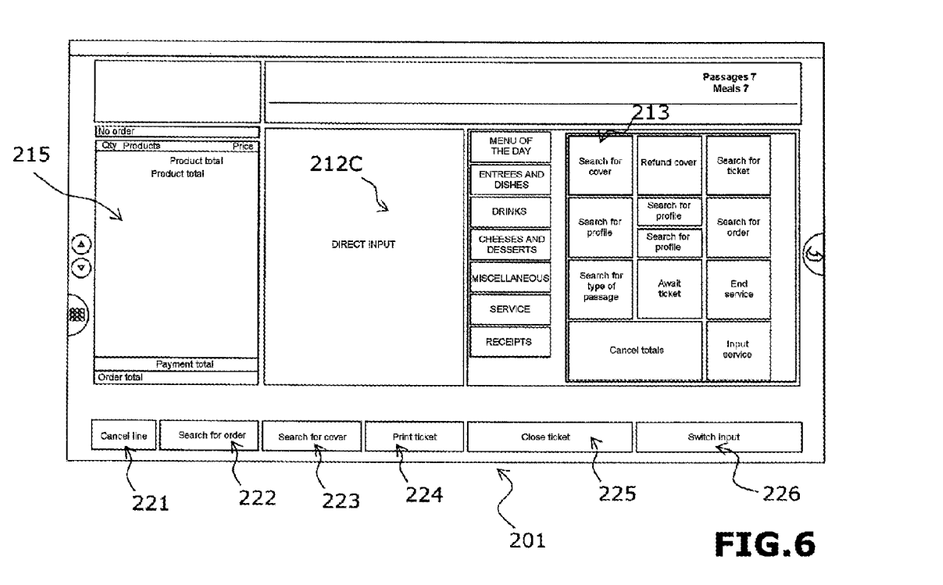
FIG. 6 is a schematic view of a direct input interface of a processing station according to an embodiment of the invention.

As illustrated in FIG. 5 and in FIG. 6, a button 226 allows the operator to switch between preorder processing interface 200 and another interface, called direct input interface 201, in which no product image or images acquired by the acquisition station 1 is or are displayed. In this direct input interface, the operator uses the interface to input the product data into the order without loading preorder data. In particular, no preorder image datum is loaded into the direct input interface 201.

According to a particular aspect, the direct input interface 201 repeats the main elements of the preorder processing interface 200, except with regard to the zones 212A and 212B of the processing interface 200 which are replaced in the direct input interface 201 by a zone 212C without any image display and without elements for navigating in the stack of preorders. Thus, the direct input interface no longer shows information relating to the preorders.

When the direct input interface 201 is used, the processing unit 21 generates an order 420, called direct order. This direct order is not associated with a preorder. The direct order 420 comprises a datum identifying a person, and reference product data corresponding to one or to each selection button of the direct input interface 201 invoked by the operator.

The button 226 thus makes it possible to exit from the preorder management to switch to direct input (that is to say, input without preorder data), and vice versa, which makes it possible not to dedicate a processing station 2 solely to the processing of preorders 310, but also makes it possible to address particular situations in which, for example, the user does not have a badge.

At least a part of the data of a ticket is accessible from a terminal 6, preferably via a web portal or a mobile application, to allow the user, to whom the order 410 for example corresponds, to view information 601, 602 associated with the ticket. The user accesses this information associated with his or her account through a login and corresponding password or through an identification token.

Figure 7:
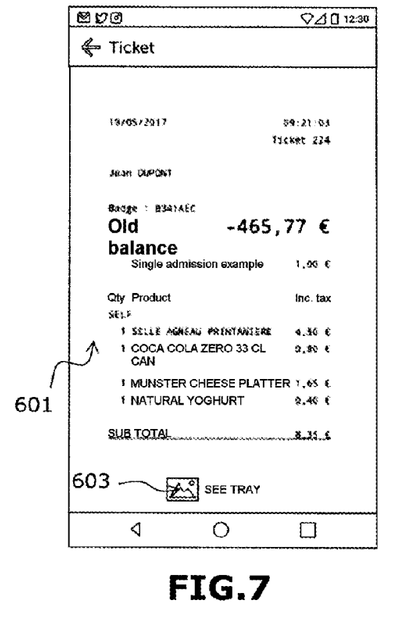
FIG. 7 is a user telephone screen grab displaying information on a ticket corresponding to an order of the user according to an embodiment of the invention.

As illustrated in FIG. 7 with the example of a user who wants to be able to check the information associated with his or her transaction, the terminal 6 makes it possible to display ticket data, such as the list of the products, their prices, their quantity and other information linked to the account of the user, such as his or her identifier and the corresponding account balance.

Figure 8:
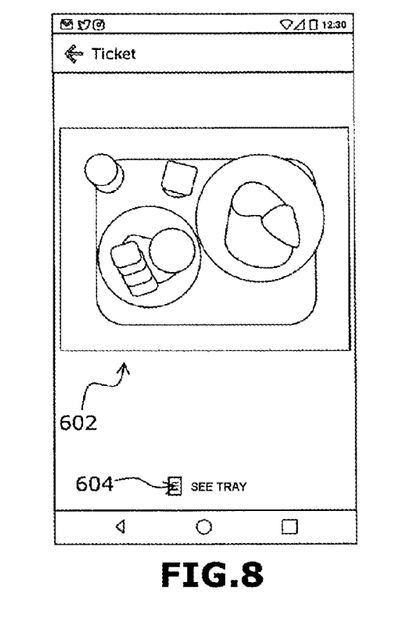
FIG. 8 is a screen grab of a user telephone screen displaying an image associated with the ticket information of FIG. 7.

The application also displays an icon 603 which allows the user to display at least one image 602 (FIG. 8) corresponding to one of the acquired images, preferably the image from above of the tray and of its content, which allows the user to check that the product list data input and the content of said tray match. The user can also revert to the display of the list of products input using the icon 604. Provision can also be made for the user to be able to access his or her ticket via a client portal via a terminal such as a computer.

The terminal 6 is, for example, a smartphone, a tablet or a personal computer of a user.

According to one embodiment, the terminal 6 can be used to validate a preorder and thus generate an order. A ticket can also be generated from this order.

The installation can also comprise a terminal that can be used by the operator via a specific interface, such as a management portal, designed to consult information corresponding to the tickets, orders and/or preorders. The terminal can also be formed by the processing station 2 itself.

Because of the architecture of such an installation, the acquisition station 1 can operate independently of the processing station 2. In other words, there is no need for the processing station 2 to have finalized the processing of a preorder for the acquisition station 1 to be able to generate new preorders.

As long as there remain preorders to be processed, the processing station 2 can process the preorders 310 generated, independently of whether the generation of new preorders continues or has stopped. The processing station 2 can thus function independently of the acquisition station 1.

The user uses the acquisition station 1 individually, inasmuch as a user deposits his or her tray on the laying surface, then takes it once the image or images has or have been acquired, which allows the next user to proceed likewise. In other words, a user can place his or her tray in the laying zone when the preceding user has removed his or hers.

According to one embodiment, the control device 17 is also configured to, after the identifier has been associated with the acquired images, command an exit authorization or indication device 9 to allow or indicate to the user to take back his or her tray (to go and eat).

In other words, when the identification of the user is completed and the images are acquired, the acquisition station emits a validation signal which can be interpreted by a controller, whether this controller is a physical person (when the validation signal is a light indicator or a ticket to be presented) or a mechanical access control system, such as a gate.

In the example illustrated in the figures, the authorization device 9 comprises lamps which emit a light of a given color, for example green, when the processing and computation unit commands the emission by the lamp or lamps of said colored light corresponding to an exit authorization or passage validation.

The use of the lamp as authorization (or validation) device allows for a supervision of the process by a supervisor. Provision can also be made for said lamps to make it possible to identify the status of the station (service open or closed).

The permission to remove the tray is validated by the control device when the acquired image of the tray and the identifier of the holder of the tray have been associated. Advantageously, an additional validation condition can be that the identifier corresponds to a user authorized to eat in the dining hall associated with the station. An additional validation condition can also be that the account of the user corresponding to the identifier have a sufficient credit and/or allows a sufficient debit. Thus, a predetermined threshold of credit on the account or of maximum authorized debit can be introduced as validation parameter.

Various modes of operation of the installation can be envisaged.

According to an embodiment applied for example to collective catering, the user goes to an acquisition station and lays his or her tray on the laying surface 11. The acquisition station 1 which was previously in activity standby mode, detects, using the image acquisition device 14, a movement corresponding to the introduction of the tray on the laying surface. The acquisition station 1 then issues interactive information assisting in the positioning of the tray.

The acquisition station 1 detects a possible contact between the tray or a content of the tray and the sides of an imaginary frame displayed on the screen 19 overlaid on the image of the tray.

The imaginary frame is a frame corresponding to the edges of the image in which the tray and its content are intended to be positioned to be considered correctly positioned. In case of contact of the tray or of its content with a side of said frame, said side is for example displayed in red and a repositioning instruction message is displayed. When the assembly formed by the tray and its content is correctly positioned in the frame, that is to say away from the edges of the frame, the latter is for example displayed in green, and a message is displayed on the screen 19 to prompt the user to present his or her badge.

These steps of checking and validating the positioning of the tray make it possible to limit the acquired data processing time, since these steps make it possible to ensure that the acquired images are usable at the processing station 2, while the user is guided during these steps, such that the time of passage of the user at the acquisition station 1 is reduced.

The user then presents his or her badge 16 in front of the reader 15. After a step of checking right of passage as a function of the account associated with the badge and possibly as a function of its balance, the acquisition device 14 then takes images of the tray and of its content from different angles.

The shots from three different angles provide the operator of the processing station with an overview of the tray and of its content.

Once the acquisition operations have been completed, the user can remove his or her tray and to go and eat, while another user can position his or her tray on the laying surface of the acquisition station.

Said data acquired by the acquisition station 1 during the passage of a user form a preorder that is stored and that can be accessed by the processing station 2. After the passage of several users, a stack of preorders is thus obtained.

An operator present at the processing station 2 can then process a preorder that he or she can select using the navigation zone of the processing interface 200 or which can automatically be selected by the processing station 2.

The processing interface 200 allows the operator to navigate in the stack of preorders and to process each preorder by inputting, into a corresponding order, the product data which correspond to the products present in the images displayed on the screen which are derived from the preorder. The input of product data into an order corresponds to the writing into the order memory of said product data while associating them with the data already present in the order.

Upon the selection of a preorder in the processing interface 200, the acquired images contained in the preorder are displayed, and the operator can input, that is to say add into an order corresponding to the preorder, using the selection buttons of the processing interface 200, data corresponding to the names, prices and quantities of the products present on the images to construct the order. When the operator considers the order to be completed, that is to say when the reference product data corresponding to the products present on the images have been input (added) into the order, the operator can close the order.

On closure of the order, a ticket is generated. This ticket lists the product name, price and quantity data derived from the order, to which are added specific data corresponding for example to tax data (VAT) and/or the payment method. An image, preferably low resolution and corresponding to one of the images of the preorder, is also included in the ticket data. The ticket is accessible to the user who can consult it from a terminal, such as his or her telephone, and/or print it from a corresponding terminal. The product data included in the ticket and the corresponding image of the tray can also be consulted by the operator, for example from a management portal that can be accessed from a terminal, such as the processing station.

Provision can be made for an amount relating the price of the products deriving from the order to be debited from the corresponding user account.

In case of dispute concerning a ticket, provision can be made for the operator to be able to modify the order, and correct the existing ticket or issue a corresponding new ticket.

According to a particular aspect, provision can be made for the processing station 2 to be associated with or comprise an identifier reader, such as a badge reader, so that when the identifier is read by this reader, the processing station 2 triggers, relative to the stack of preorders, an automatic positioning of the navigation zone of the processing interface on the preorder corresponding to said badge identifier. Such a configuration makes it possible, when a user wants to modify an order, to automatically load into the processing interface the data relating to the corresponding preorder. Such a configuration also makes it possible to manage the case of users for whom a preorder has been generated but who must pass through the processing station to close the corresponding order, for example because of a balance shortfall.

As recalled above, it is possible to couple several acquisition stations, while a single processing station is used by one operator to process the preorders deriving from the different acquisition stations. Such an installation design makes it possible to further increase the checkout passage capabilities. It is also possible to provide for the installation to comprise several processing stations allowing several operators to access a single stack of preorders.

The functions and steps described above can be implemented in the form of a computer program or via hardware components (for example, programmable gate arrays). In particular, the functions and steps carried out by the acquisition station and the processing station, and in particular by their control or processing unit, can be performed by sets of computer instructions implemented in a (micro)processor or controller or be performed by dedicated electronic components or components of FPGA or ASIC type. It is also possible to combine computing parts and electronic parts.

The computer programs, or computer instructions, can be contained in program storage devices, for example computer-readable digital data storage media, or executable programs. The programs or instructions can also be executed from program storage peripheral devices.

According to a particular aspect, the preorders, orders and tickets are stored in the form of one or more databases.

The invention is not limited to the embodiments illustrated in the drawings. Consequently, it should be understood that, when the features mentioned in the attached claims are followed by reference symbols these symbols are included only in order to improve the intelligibility of the claims and are in no way limiting on the scope of the claims.

Furthermore, the term "comprising" does not exclude other elements or steps. Furthermore, the features or steps which have been described with reference to one of the embodiments explained above can also be used in combination with other features or steps of other embodiments explained above.

The invention claimed is:

1. An installation comprising:
    an acquisition station for acquiring data relating to a product or a set of products, for several successive users, said acquisition station comprising:
    a laying surface allowing a user among said several successive users to lay down said product or set of products;
    an image acquisition device oriented toward the laying surface;
    an identification device to identify the user;
    a control device that acquires an identifier of each of said users among said several successive users;
    said control device acquiring an image of said product or set of products with the image acquisition device, before or after the step of acquisition of the identifier of each user;
    a memory in which are stored preorders, the preorders comprising a preorder for each user, said preorder comprising a datum corresponding to the identifier of the user and a datum corresponding to the acquired image;
    a memory in which are stored orders, each order comprising at least a part of the data of one of said preorders;
    a processing station comprising a display screen, a human-machine interface and a processing unit that displays, on the screen, a preorder processing interface which comprises:
    a navigation zone for selecting a preorder;
    an image display zone for displaying the image of the preorder;
    an identifier display zone for displaying an identification datum of the user with which the preorder is associated;
    selection elements each associated with a reference product,
    an order zone;
    wherein when one of said selection elements is invoked by an operator, said processing unit of the processing station displays a datum of the corresponding reference product in said order zone, and add, in an order associated with the preorder, the datum of said reference product.

2. The installation as claimed in claim 1, wherein the installation comprises a database of user accounts in which are recorded user account data, each user account comprising:
    an identifier of a user;
    a balance value, credit or debit;
    and in that the control device determines whether the identifier of the user that has been acquired corresponds to the identifier of the user of a recorded user account.

3. The installation as claimed in claim 2, wherein each user account comprises right-of-use information to indicate whether the user associated with the user account is or is not authorized to use said acquisition station or the installation,
    and in that the control device authorizes or does not authorize the use of the acquisition station or of the installation as a function of the right-of-use information associated with said user account after having determined whether the user account corresponds to the identifier of the user that has been acquired.

4. The installation as claimed in claim 1, wherein the installation comprises a memory in which are stored sets of data called tickets, each ticket comprising at least a part of the data of an order and/or a part of the data of the associated preorder, and in that at least a part of the data of a ticket associated with a user is accessible from a terminal.

5. The installation as claimed in claim 1, wherein the acquisition station functions independently of the processing station.

6. The installation as claimed in claim 1, wherein the processing station processes preorders that have been generated, independently of whether the acquisition station is continuing to operate or has stopped.

7. The installation as claimed in claim 1, wherein said processing station switches between the preorder processing interface and a direct input interface, in which no image of product acquired by the acquisition station is displayed, said processing unit generating a direct order, which includes at least one datum of a reference product corresponding to a selection element invoked by the operator upon a use of the direct input interface.

8. The installation as claimed in claim 1, wherein the processing unit automatically selects said preorder by displaying the corresponding identification and image data in the preorder processing interface when the identifier of a user is input or detected, and a preorder is associated with said identifier.

9. The installation as claimed in claim 1, wherein said processing station allows the operator to act on the image, by zooming or navigating in the image.

10. The installation as claimed in claim 1, wherein each preorder comprises preorder status information indicating whether the preorder is:
to be processed; or
currently being processed, or processed; and in that the processing station filters the preorders to be displayed in the processing interface as a function of their status.

11. The installation as claimed in claim 1, wherein, each reference product comprises a product naming datum, a price datum, and a quantity datum,
said processing unit of the processing station adds these product naming, price, and quantity data into the order when said reference product is selected in the preorder processing interface.

12. The installation as claimed in claim 1, wherein, said preorder also comprising, for each image, a position datum relating to the product or the set of products relative to said image, said processing station displays, in the image zone of the processing interface, an enlarged view of said image as a function of said position datum.

13. The installation as claimed in claim 1, wherein, with the acquisition station, comprising a display screen, and with the image acquisition device, comprising a camera, the control unit is configured to:
trigger a display on the screen of the image filmed by the camera when the introduction of the product or of the set of products on the laying surface is detected;
trigger a stopping of the display of the filmed image when the product or the set of products is removed from the laying surface.

14. The installation as claimed in claim 1, wherein the processing station enables a modification of the orders corresponding to the preorders that have been processed.

15. The installation as claimed in claim 1, wherein the installation comprises several processing stations and/or several acquisition stations.

16. A product data management method, implemented using an installation according to claim 1, wherein the method includes the generation of preorders using the acquisition station, wherein said method comprises, using the processing station, the following steps of:
displaying an image of a preorder in the image display zone of the processing interface;
using selection elements of the processing interface of the processing station, adding, into an order associated with the preorder, data of a reference product corresponding to a product present in the displayed image.

17. The method as claimed in claim 16, wherein the steps performed using the processing station are performed asynchronously with respect to that or those performed with the acquisition station.

* * * * *